UNITED STATES PATENT OFFICE.

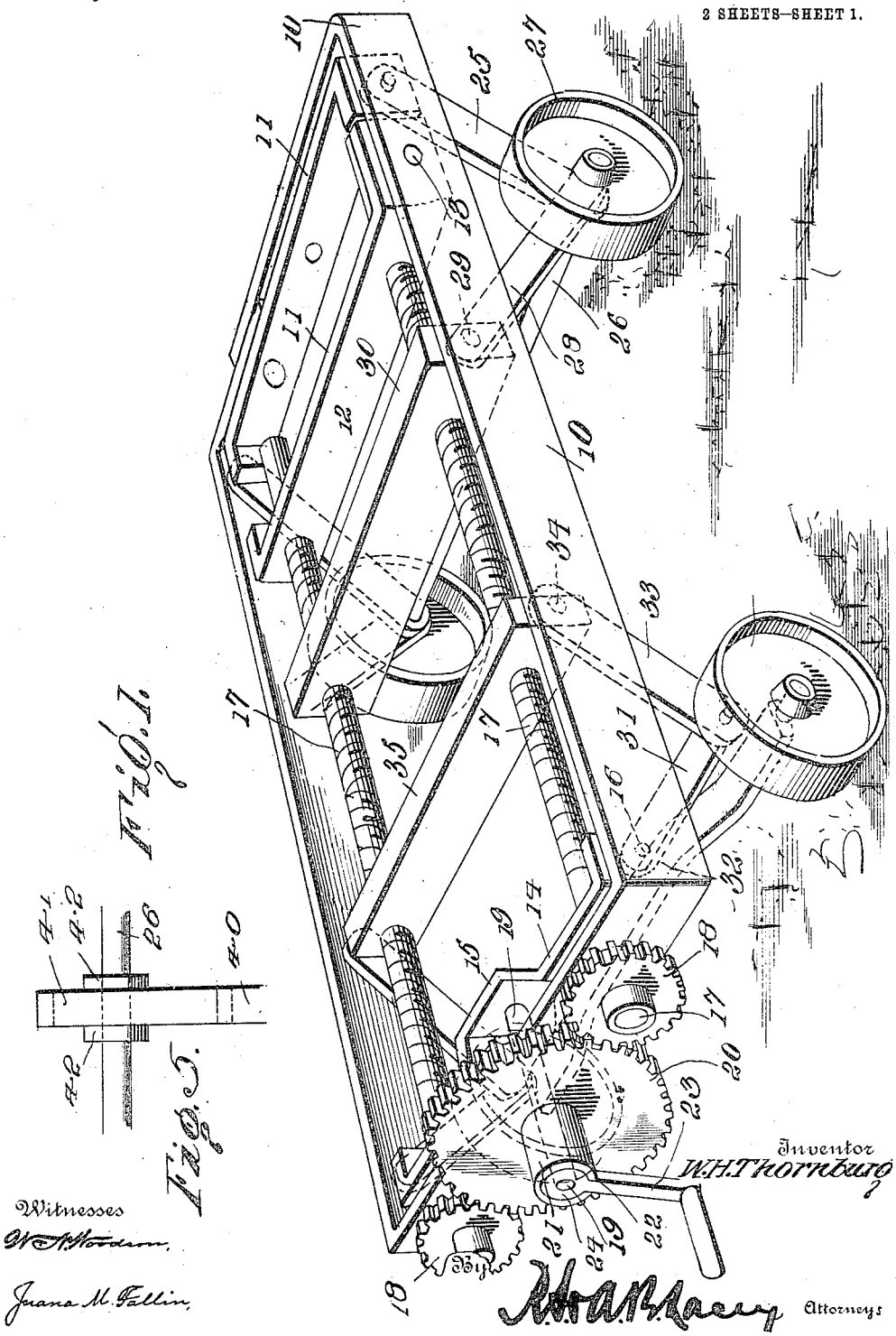

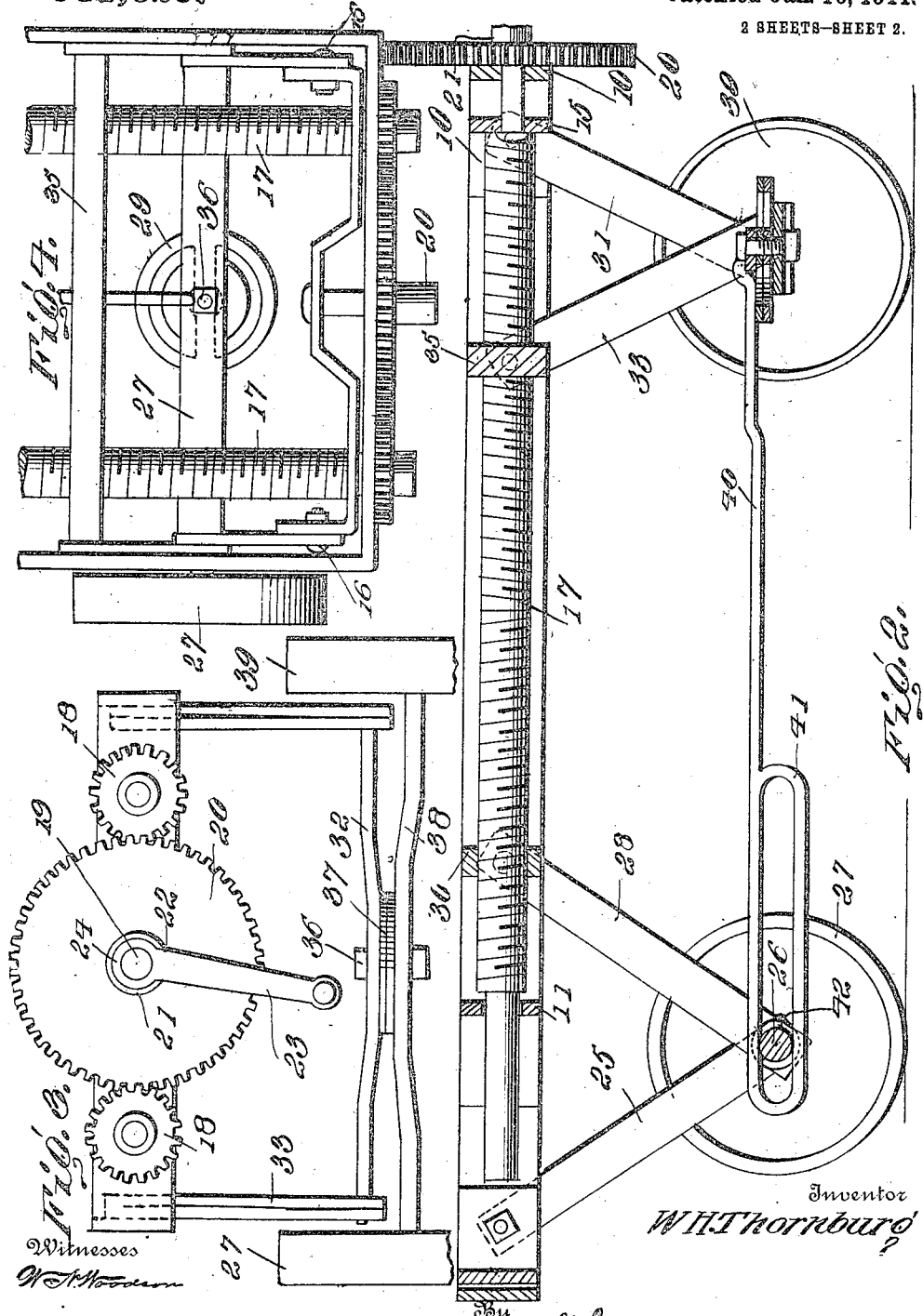

WILLIAM H. THORNBURG, OF EAST ST. LOUIS, ILLINOIS.

ELEVATING-TRUCK.

981,329.	Specification of Letters Patent.	Patented Jan. 10, 1911.

Application filed April 9, 1910.  Serial No. 554,567.

*To all whom it may concern:*

Be it known that I, WILLIAM H. THORNBURG, citizen of the United States, residing at East St. Louis, in the county of St. Clair and State of Illinois, have invented certain new and useful Improvements in Elevating-Trucks, of which the following is a specification.

This invention relates to elevating-trucks, and refers particularly to a device adapted for warehouses, stores, and such other places wherein heavy articles are to be moved about.

This invention has for an object to provide a strong and durable truck which is constructed for the reception of objects having considerable weight, and by means of which the objects may be easily raised or lowered into various horizontal planes, when on the truck, by the rotation of a single crank-arm.

For a full understanding of the invention reference is to be had to the following description and accompanying drawings, in which:—

Figure 1 is a perspective view of the complete truck. Fig. 2 is a longitudinal central section through the same. Fig. 3 is a front end elevation, and Fig. 4 is a top plan view of the forward end of the truck. Fig. 5 is a detail view.

Referring to the drawings the numeral 10 designates the frame of the truck which is rectangular in form and is preferably constructed of metal. In the rear end of the frame a U-shape brace 11 is positioned having arms thereof spaced slightly inwardly from the side bars of the frame. The brace 11 lies in the plane of the frame, having the cross bar thereof engaged against the rear end of the frame 10 to secure the overlapped extremities of the stub which comprises the frame. The frame 10 is further provided with a second U-shape brace 12 which is spaced forwardly a slight distance from the brace 11 and which is turned in an opposite direction. The arms of the brace 12 are secured by rivets 13 or the like against the inner faces of the sides of the frame. Within the forward end of the frame a brace 14 is positioned having an off-set portion 15 centrally thereof. The arms of the brace 14 are secured against, and in spaced relation relative to the side bars of the frame by means of rivets 16. A pair of shafts 17 are longitudinally arranged within the frame and are spaced slightly from the side bars thereof. The rear ends of the shafts 17 are rotatably disposed through the brace 12 while the forward ends of the shafts are supported through the forward brace 14 and the forward end of the frame 10. The extremities of the shafts 17 are provided with pinions 18 which are rigidly secured thereto and which are positioned against the forward end of the frame. A stub shaft 19 is journaled through the central portion of the forward end of the frame and the off-set portion 15. A spur gear 20 is loosely mounted upon the stub shaft 19 in alinement with the pinions 18, the spur gear 20 being meshed with the pinions 18. A sleeve 21 extends outwardly from the spur gear 20 and is provided with an enlarged aperture terminating at one side of the sleeve in a slot 22. A crank arm 23 is inserted through the slot 22 and carries upon its inner end an enlarged head 24 which is received within the enlarged opening in the outer end of the sleeve 21. The stub shaft 19 passes loosely through the head 24.

It is thus observed that by this construction the spur gear is revolved by the rotation of the crank arm 23 independently of the stub shaft 19. Fixed links 25 are hingedly mounted at their upper ends between the side bars of the frame 10 and the arms of the brace 11. The lower ends of the links 25 carry the rear axle 26 upon the opposite ends of which are disposed the rollers 27. The axle 26 carries at its opposite ends movable links 28 which extend upwardly and forwardly and are pivotally supported upon studs 29 projecting from the ends of the traveling bar 30. The forward end of the frame 10 carries a pair of fixed links 31 which are pivotally disposed upon the rivets 16 between the arms of the forward brace 14 and the side bars of the frame. A bolster 32 is carried at its opposite ends and in pivotal relation upon the lower extremities of the links 31. Movable links 33 are carried upon the extremities of bolster 32, the links 33 extending upwardly and backwardly to pivotally engage upon studs 34 which are carried upon the opposite extremities of a second traveling bar 35.

The longitudinal shafts 17 are threaded throughout their lengths, the threads being of opposite pitch from the central portions thereof toward their extremities. The traveling bars 30 and 35 are provided with threaded apertures adjacent their ends to receive the shafts 17 therethrough. The bolster 32 is arched downwardly at its central portion and carries a bolt 36 which extends downwardly through a fifth wheel 37 to support the front axle 38. The axle 38 is provided upon its opposite ends with rollers 39 for supporting the frame. The bolt 36 carries the forward end of a reach bar 40 which extends backwardly and rests upon the upper face of the rear axle 26. The reach bar 40 is provided with a returned portion 41 which is spaced downwardly therefrom to form a loop for the reception of the axle 26. The axle 26 is preferably provided with spaced collars 42 which are carried against the opposite sides of the reach bar 40 to hold the same centrally upon the axle 26.

When the handle 23 is rotated the spur gear 20 is carried therewith and rotates the pinions 18. This movement of the pinions revolves the shaft 17 to turn the same through the traveling bars 30 and 35. As the threads upon the ends of the shaft 17 are of opposite pitch the bars 30 and 35 will be moved toward or from each other in accordance with the direction in which the handle 23 is turned. The traveling bars 30 and 35 respectively carry the movable links 28 and 32 to swing the axle 26 and the bolster 32 downwardly from or upwardly against the frame 10 to raise or lower the truck. Any adaptable size of pinions 18 and spur gear 20 may be employed to vary the ratio therebetween so as to effect the raising of light or heavy weights, or in accordance with the work which is to be accomplished by the improved truck.

Having thus described the invention what is claimed as new is:—

1. An elevating truck including a frame, links hinged at the opposite ends of the frame, axles carried in the lower ends of the links, a pair of shafts longitudinally journaled in the frame and having threads of opposite pitch upon their ends, traveling bars engaging in threaded relation over the ends of said shafts and adapted for longitudinal movement within the frame, traveling links hinged between the said axles and said traveling bars, braces arranged in the opposite ends of the frame for supporting said shafts, the forward ends of said shafts extending through the frame, pinions rigidly carried upon the outer ends of the shafts, and an intermeshing gear-wheel arranged between the pinions for imparting rotation to the shafts.

2. An elevating truck including an elongated frame, U-shaped braces arranged within the opposite ends of the frame, shafts in the braces and having their extremities reduced for engagement therethrough, revolving means for simultaneously actuating said shafts, traveling-bars disposed in spaced and threaded relation on the ends of said shafts and adapted for longitudinal movement in the frame, axles hingedly carried by the frame, and traveling links arranged between the axles and said traveling-bars for adjusting the distance between the axles and the frame.

In testimony whereof I affix my signature in presence of two witnesses.

WILLIAM H. THORNBURG. [L. S.]

Witnesses:
E. J. DELMORE,
MARY SAUNDERS.